United States Patent [19]
Darago

[11] Patent Number: 5,226,792
[45] Date of Patent: Jul. 13, 1993

[54] DISTRESS FLAG FOR AUTOMOBILE WINDOW

[76] Inventor: Joanne R. Darago, 4640 Suburban Pines Dr., Lake Worth, Fla. 33463

[21] Appl. No.: 306,486

[22] Filed: Feb. 3, 1989

[51] Int. Cl.$^5$ .............................................. G09F 21/04
[52] U.S. Cl. ........................................ 40/591; 40/600; 40/604
[58] Field of Search ............... 40/603, 593, 617, 584, 40/621, 604, 591, 597, 600; 2/247, 207, 199; 116/28 R, 173

[56] References Cited

U.S. PATENT DOCUMENTS

| | | | |
|---|---|---|---|
| 2,177,905 | 10/1939 | McKeehan | 40/621 |
| 2,835,899 | 5/1958 | Monro et al. | 2/243 R |
| 3,024,552 | 3/1962 | MacLea | 116/28 R |
| 3,042,940 | 7/1962 | Keaton | 116/173 |
| 3,239,957 | 3/1966 | Snediker | 40/603 |
| 3,698,111 | 10/1972 | Smith | 40/600 |
| 3,738,039 | 6/1973 | DeFuria | 40/591 |
| 3,775,887 | 12/1973 | Precourt | 40/603 |
| 3,903,629 | 9/1975 | Gruna | 40/591 |
| 3,949,503 | 4/1976 | Waress | 40/591 |
| 4,163,426 | 8/1979 | O'Neill | 40/591 |
| 4,178,874 | 12/1979 | Berns et al. | 40/591 |
| 4,182,063 | 1/1980 | Klosel | 40/124.1 |
| 4,264,666 | 4/1981 | Hix | 40/586 |
| 4,375,134 | 3/1983 | Sheetz | 40/591 |
| 4,565,152 | 1/1986 | Bennett | 40/591 |
| 4,607,444 | 8/1986 | Foster | 116/28 R |
| 4,827,646 | 5/1989 | Miller et al. | 40/591 |

FOREIGN PATENT DOCUMENTS

| | | | |
|---|---|---|---|
| 2141384 | 8/1971 | Fed. Rep. of Germany | 40/591 |
| 2124008 | 2/1984 | United Kingdom | 40/597 |

*Primary Examiner*—Kenneth J. Dorner
*Assistant Examiner*—Brian K. Green
*Attorney, Agent, or Firm*—Jack N. McCarthy

[57] ABSTRACT

A distress flag for a vehicle with the flag being made of foldable material. The distress flag is positionable in use over the top edge of a window of a vehicle so that it can hang downwardly, displaying a printed message. Magnetized weights are fixed to edges of the distress flag to pull it down to properly display the message in use. For storing the flag when not in use, a pocket is fixed to the distress flag so that the flag can be folded into a compact form and placed within the pocket.

4 Claims, 4 Drawing Sheets

Fig. 4
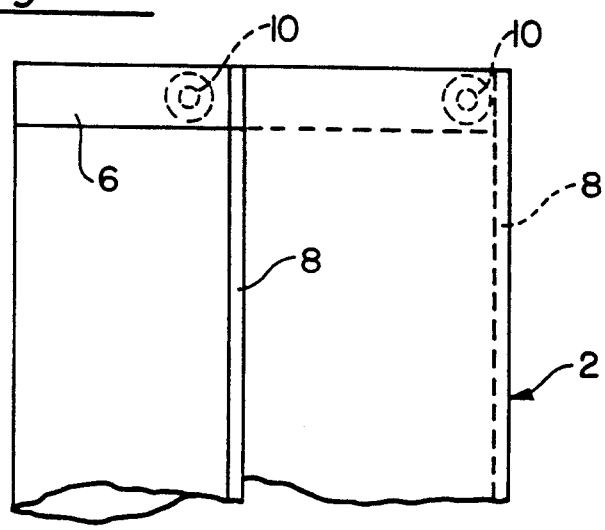
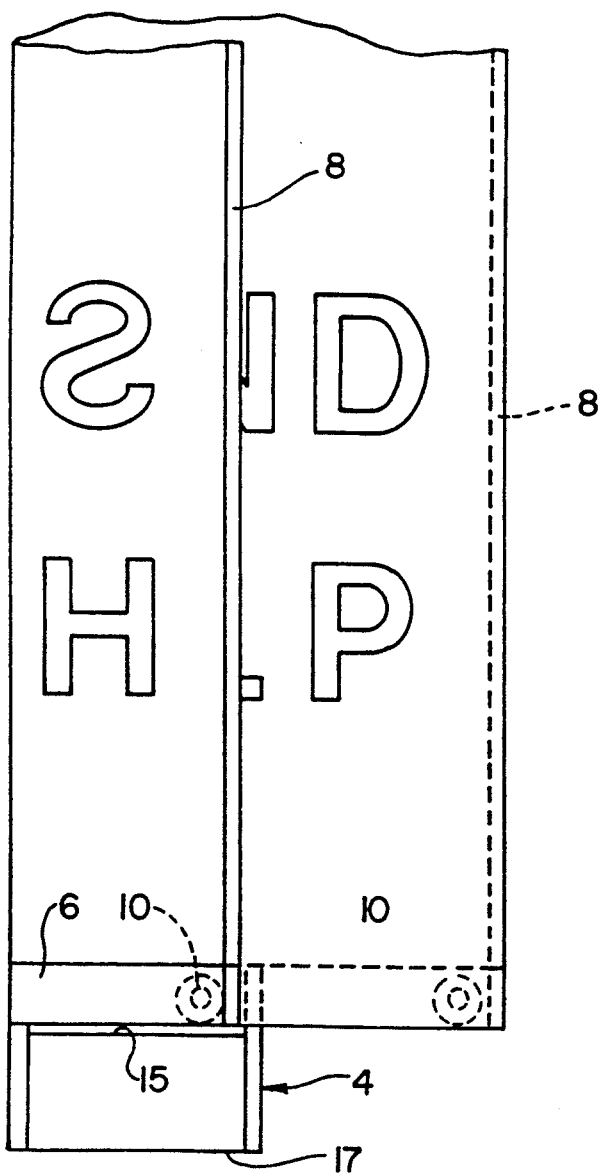
Fig. 5
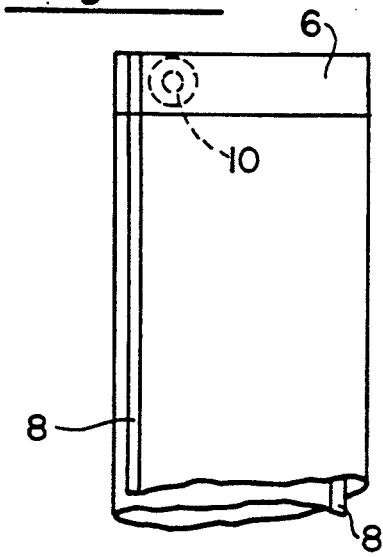
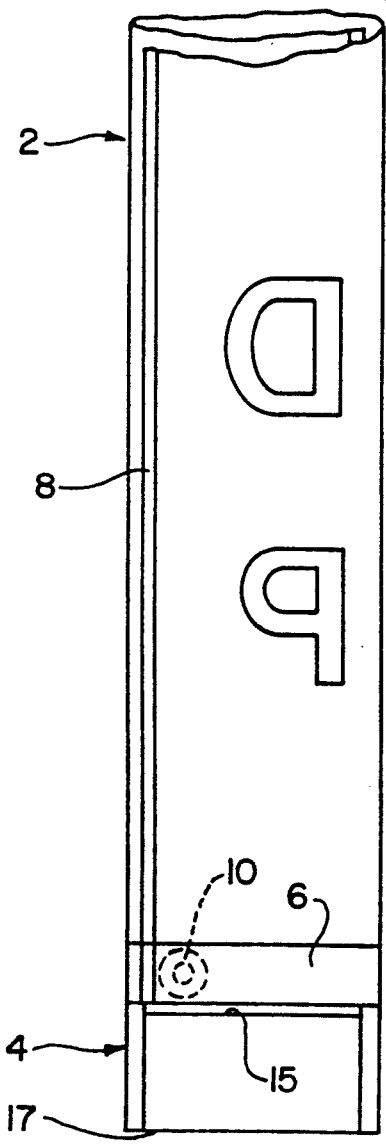

DISTRESS FLAG FOR AUTOMOBILE WINDOW

TECHNICAL FIELD

This invention relates to a foldable distress flag which can be folded into an attached pocket and kept in the glove compartment of an automobile for emergencies when it can then be removed, unfolded, and placed over the top edge of a movable automobile window.

BACKGROUND ART

To attract attention to a situation in which help is needed, some motorists use their flashing lights. Others have used a printed sign or a makeshift card with distress words written thereon. A distress kit for motorists is shown in U.S. Pat. No. 4,471,873.

DISCLOSURE OF INVENTION

An object of this invention is to provide a distress flag which can be easily kept in an automobile (especially in the glove compartment), found when needed, and having distress words such as "SEND HELP" printed thereon in large, easily readable letters.

Another object of this invention is to provide a rectangular distress flag with magnetized weighted objects fixed at an end of the distress flag for holding the viewed portion of the flag in a readable position, especially when hanging outside of an automobile window.

A further object of this invention is to provide a distress flag having a pocket attached thereto which can be used for (1) receiving the distress flag in a folded compact condition for storing; or (2) receiving an extra weighted object when the flag is in use to hold the bottom portion of the flag down.

Another object of this invention is to provide a cover on the pocket holding the distress flag to help keep it clean.

A further object of this invention is to have a distress flag made of flexible material, such as cloth, so that it can be folded into a compact form for placement in an attached pocket.

BRIEF DESCRIPTION OF DRAWINGS

FIG. 4 is a front view of the distress flag with one side folded over to prepare the distress flag for placing it in a compact form for insertion into the pocket;

FIG. 5 is a view similar to FIG. 4 where the other side of the distress flag has been folded over the first folded side to position the distress flag for further downward folding into a final compact form for insertion into the pocket;

BEST MODE FOR CARRYING OUT THE INVENTION

Figure 1:
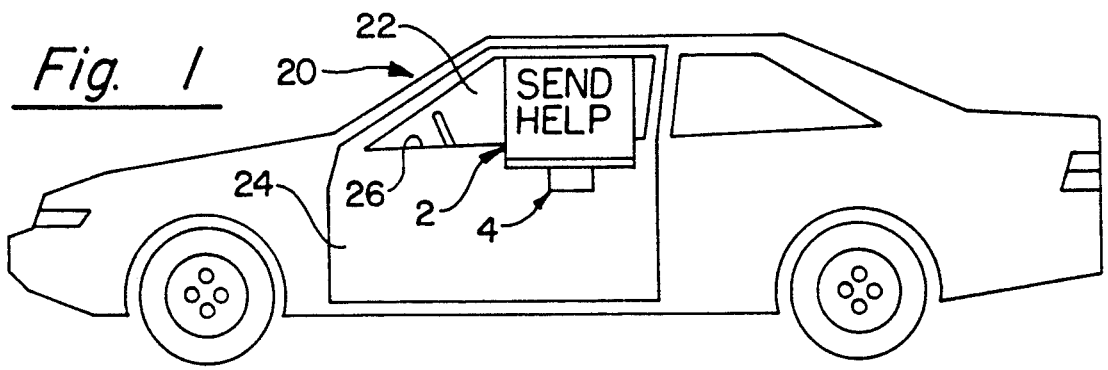
FIG. 1 is a side view of an automobile with the distress flag placed over the top of the window of the door displaying a message.

As set forth in FIG. 3, a distress flag 2 is shown from the rear spread out in a flat manner with a pocket 4 attached thereto at one end for a purpose to be hereinafter described. The distress flag 2 is formed having a wide hem 6 at the top and bottom thereof and a narrow hem 8 formed along each edge. Each hem 6 encloses a plurality of magnetic weights 10 spaced along its length for a purpose to be hereinafter described.

Pocket 4 is formed having one side 12 longer than the other side 14, with an entrance to the pocket 4 formed at edge 15, and the bottom of the pocket 4 at 17. The edges of the pocket 4 are fixed together, such as by stitching, and are shown with a reinforcing tape 16 along each joined side. The top of the longer side 12 of the pocket 4 is placed under the center of a hem 6 at one end and connected to the distress flag 2 by the stitching which fixed the hem 6 on the distress flag 2. While stitching has been described as fixing the hems 6 and pocket 4, other known means can be used, such as bonding.

Figure 2:
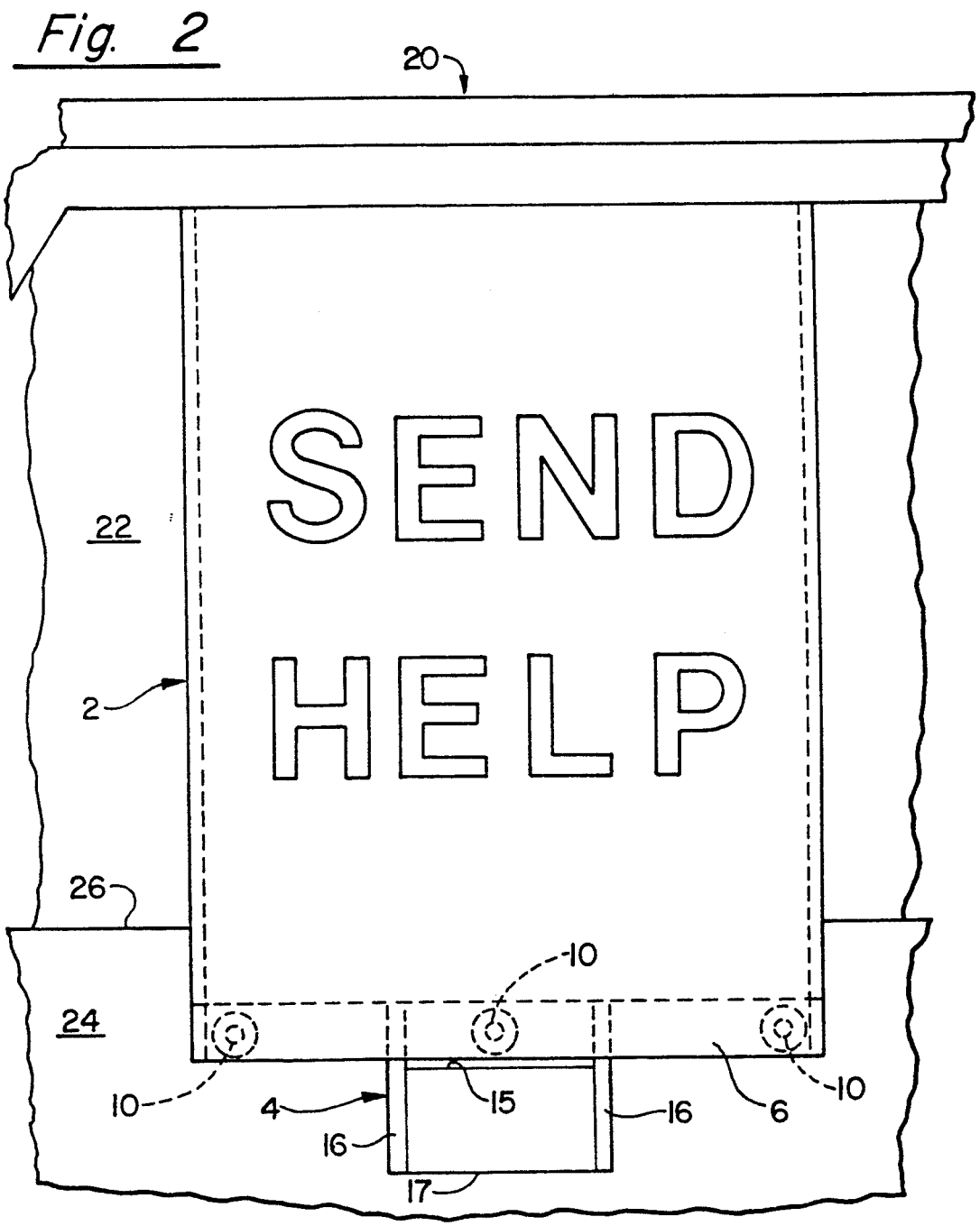
FIG. 2 is an enlarged view of a portion of FIG. 1 showing details of the distress flag.
Figure 3:
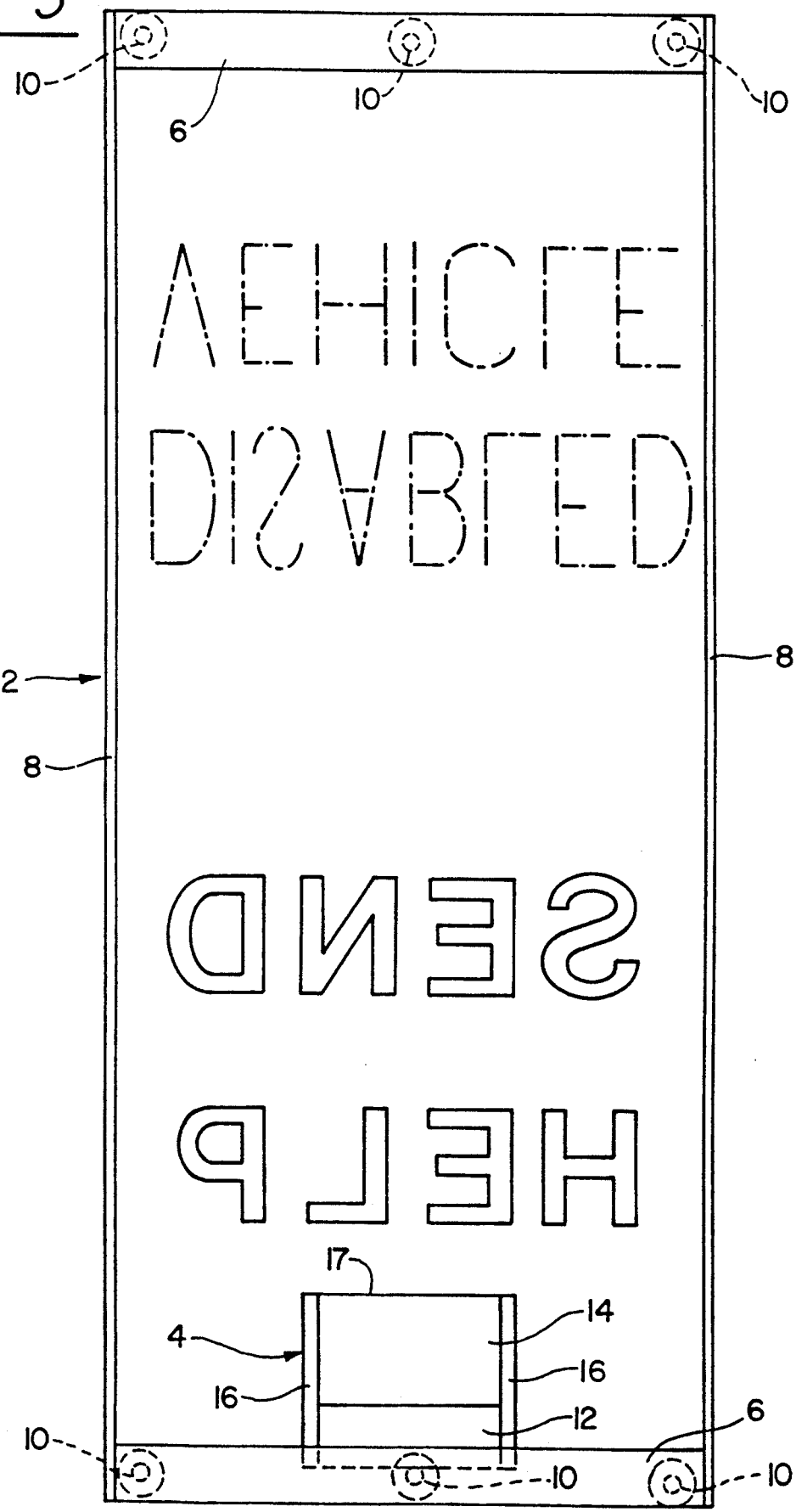
FIG. 3 is a rear view of the distress flag showing a pocket fixed to one end thereof.

While the pocket 4 is shown extending inwardly in FIG. 3 for the description, it hangs downwardly, away from the distress flag 2, with the entrance edge 15 positioned forwardly, when the distress flag 2 is mounted for display of any message adjacent the pocket 4 (see FIGS. 1 and 2). The distress flag 2 is pulled down by the weights 10 when held at the center position. FIG. 3 shows two examples of distress messages—(1) SEND HELP and (2) VEHICLE DISABLED. "SEND HELP" is shown in properly sized letters, while "VEHICLE DISABLED" is shown by letters indicated in phantom. Any message or wording desired can be placed on a distress flag 2.

An automobile, or vehicle, 20 is shown in FIG. 1 with a distress flag 2 positioned over the top of a movable window 22. As mentioned above, the distress flag 2 is pulled down by the weights 10.

When the distress flag 2 is placed over the top of the movable window 22 of the automobile 20, with the message properly showing (such as SEND HELP in FIG. 2), the window 22 is rolled, or moved, up in the door 24 to fix the distress flag 2 at a mid-point, to the top of the door 24. This (1) fixes the message in the best viewing position, and (2) prevents theft of the entire distress flag 2. If possible, the distress flag 2 is permitted to overlap the sill 26, or top of the bottom portion of the door 24, so the weights 10, if they are magnetic, can be attracted to the side of the door 24, attaching the distress flag 2 thereto. It can be understood that the weights 10, by their weight alone, hold the distress flag 2 in the proper position for viewing, especially in a wind, or at least will put the distress flag 2 back to the proper position after the wind has blown. The weights, by their magnetic effect, aid in holding the distress flag 2 in its original proper position. It is to be understood that extra weight, such as a stone, can be placed in the pocket 4 if a wind is encountered which is stronger than average.

The pocket 4 serves one purpose when the distress flag 2 is not in use, and others when the distress flag 2 is in use. The distress flag 2 is made of a cloth, or fabric, so that it can be folded and placed in a compact form for storing, and the pocket 4 is positioned so that the distress flag 2 can be rolled, or turned, into the pocket 4 after it has been folded. The pocket 4 can have a name or mark on it identifying its use, and placed in the glove compartment of an automobile or other storage area. Some large cardboard signs are difficult to store when not in use and if removed from the car during non-use, may not be available when one is on the road in a distress situation.

FIGS. 4 and 5 show one way to fold a distress flag 2; others may be used. In FIG. 4, one side of the distress flag 2 is shown folded over in alignment with the entrance edge 15 of the pocket 4; in FIG. 5 the other side of the distress flag 2 is shown folded over the other folded portion, with both portions aligned with the entrance edge 15 of the pocket 4. The next step is to roll, or fold, or by a combination of both, place the distress flag 2 in a small, compact form adjacent the entrance edge 15 of the pocket 4, and then roll it into the pocket 4. It is now ready for storing without taking up a large area or risking destroying the distress flag 2 by tearing it or having any dirt marks cover a message. The distress flag 2 is maintained clean and conveniently available for proper use. As mentioned above, the distress flag 2 can be first folded in from the top and then from the sides to arrive at a compact form for insertion into the pocket 4.

Figure 6:
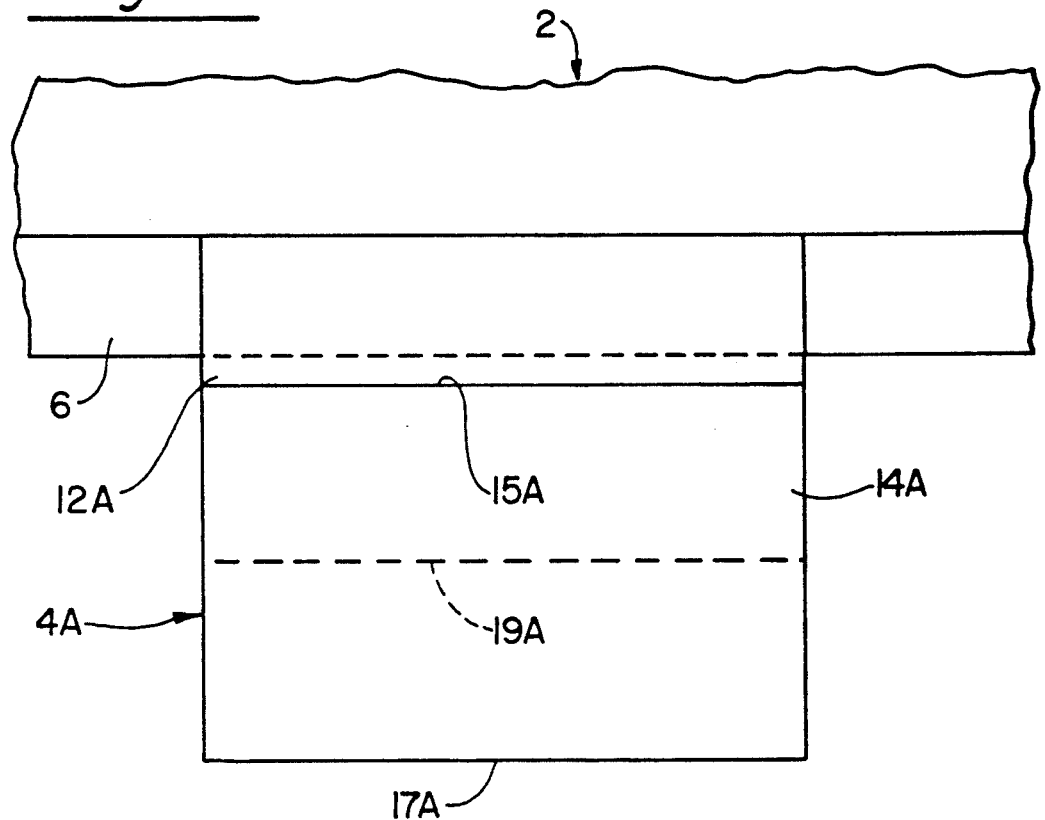
FIG. 6 is an enlarged fragmentary rear view of the distress flag showing a modified pocket attached to the distress flag in the same manner as shown in FIG. 3.
Figure 7:
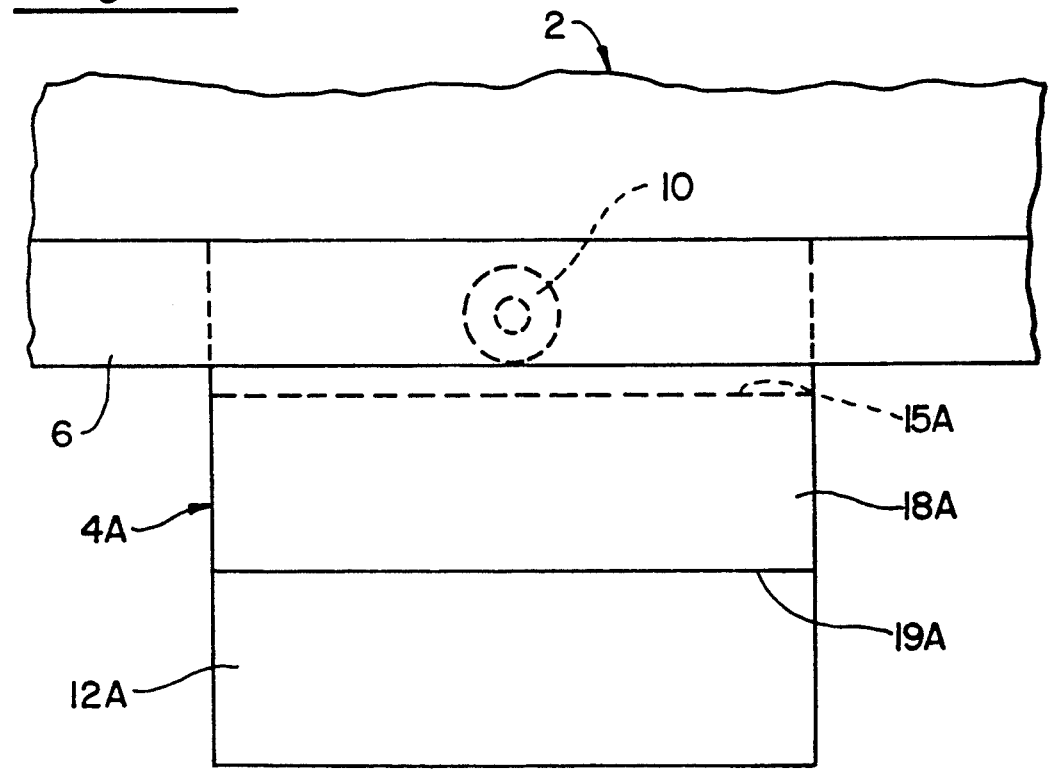
FIG. 7 is a front view of the distress flag with modified pocket as shown in FIG. 6.

A modified pocket 4A is shown in FIGS. 6 and 7, having one side 12A larger than the other side 14A, with entrance to the pocket 4A formed at edge 15A and the bottom of the pocket 4A formed at 17A. The edges of the pocket 4A are fixed together, as before, without a reinforcing tape. A cover 18A is formed on the back of the one longer side 12A by a rectangular piece of material fixed at one edge to the top edge of side 12A, fixed to each side of the pocket 4A, and extending downwardly for approximately two-thirds (⅔) of the length of the side 12A to end 19A. Cover 18A in effect forms a pocket which can be pulled over to a reverse position to cover the entrance edge 15A of the pocket 4A. The top of the longer side 12A, along with the cover 18A fixed thereto, is placed under the center of a hem 6 at one end and connected to the distress flag 2 as before, by the stitching which fixes the hem 6 on the distress flag 2.

In using a distress flag 2 with a modified pocket 4A, the distress flag 2 can be placed in a compact form, as before, at the entrance edge 15A, then placed in the pocket 4A and then the reverse pocket cover 18A can be pulled over the entrance edge 15A of the pocket 4A.

A distress flag 2 was made of nylon; the messages SEND HELP and DISABLED VEHICLE were printed on the front in red, as shown in FIG. 2, and were visible from the back with the words backwards, as shown in FIG. 3. The distress flag 2 was made rectangular in shape, approximately 14 inches in width and 32 inches in length, with the weights 10 made in a washer-like shape. The pocket 4 was also made of nylon. Pocket 4 was approximately one-third (⅓) of the width of the distress flag 2 and approximately two and three-quarter (2¾) inches deep.

While the principles of the invention have now been made clear in an illustrative embodiment, it will become obvious to those skilled in the art that many modifications in arrangement are possible without departing from those principles. The appended claims are, therefore, intended to cover and embrace any such modifications, within the limits of the true spirit and scope of the invention.

I claim:

1. A distress flag for placing over a top edge of a movable up-and-down window of a vehicle, said flag being shaped as a rectangle, said flag being made of a foldable material, said flag having two opposite ends, said flag having two complete separate messages, one of said messages being printed adjacent each opposite end of said flag so that each message can be read when said flag is folded at a mid-point of said flag between said messages with each opposite end of said flag hanging downwardly, said flag being foldable over a top edge of a movable up-and-down window of a vehicle at a mid-point of said flag between said messages with each opposite end of said flag hanging downwardly displaying one of said messages outwardly, a pocket means fixed to said flag, said pocket means being made of foldable material, said pocket means being positioned to receive said flag when said flag has been folded to a compact form so that said flag can be properly stored, said pocket means being fixed to one end of said flag under one of said printed messages, a plurality of weights being fixed to each of said opposite ends of said flag to pull each of said opposite ends of said flag downwardly for proper viewing of said outwardly displayed message when said flag is in use, said weights being small so that said flag can be folded.

2. The distress flag as set forth in claim 1 wherein said pocket means has an opening for placing a weight in said pocket means for pulling said one end downwardly to aid in properly positioning the flag for viewing one of said messages.

3. The distress flag as set forth in claim 1 wherein said mid-point of said flag between said messages is for placing over and in contact with a top edge of a window of a vehicle for support to properly display one of said messages.

4. The distress flag as set forth in claim 1 wherein said pocket means fixed to the one end of said flag under one of said printed messages extends downwardly from said one end of said flag when said one of said printed messages is displayed outwardly.

* * * * *